United States Patent Office 3,355,502
Patented Nov. 28, 1967

3,355,502
PROCESS FOR THE PRODUCTION OF MONOHYDROXY DIETHERS OF TRIHYDRIC ALCOHOLS
Hermann Delius, Ahrensburg, Germany, assignor to Reichhold Chemicals, Inc., White Plains, N.Y.
No Drawing. Filed Sept. 2, 1964, Ser. No. 394,043
8 Claims. (Cl. 260—615)

ABSTRACT OF THE DISCLOSURE

The present disclosure is concerned with a process for the production of monohydroxy diethers of $\beta,\gamma$-unsaturated alkenols and alkanols, with the characteristic that one etherifies trivalent alkanols of the general formula:

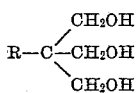

wherein R signifies a n-alkyl-, aryl- or aralkyl radical, with $\beta,\gamma$-unsaturated alkenols in at least a triple molar excess in the presence of oxides or salts of the bivalent mercury and addition compounds of the boron trifluoride, preferably in a mixture with inert organic solvents as is well known in the art.

---

The present process concerns the production of monohydroxy diethers from trivalent alkenols, which carry three methylol groups on one carbon atom.

It has been known, for the production of monohydroxy diethers to cause trivalent alkanols, which carry three methylol groups on one carbon atom, to react in suitable molar ratios with alkyl or aryl halides, such as allyl chloride or benzyl chloride in the presence of alkali hydrate, and preferably in a solvent. This process, when carried out on an industrial scale, has various disadvantages. For one thing it will be necessary to introduce the alkali and the alkyl halide in portions in the course of etherification, in the same measure as these substances are used up. Furthermore, it will be necessary after completed etherification to wash out the salts that have developed, such as sodium chloride, whereby it will not be possible to prevent considerable quantities of unreacted starting substances and intermediate products, such as allyl chloride and allyl alcohol, from being carried along by the wash water. In order to avoid losses and the contamination of the waste liquor, it will be necessary to recapture these substances, or to make them harmless, for example with the aid of potassium permanganate.

The present invention is concerned with new processes—which do not have the disadvantages just described—for the production of monohydroxy diethers of $\beta,\gamma$-unsaturated alkenols and alkanols, with the characteristic that one etherifies trivalent alkanols of the general formula:

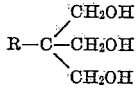

wherein R signifies a n-alkyl-, aryl- or aralkyl radical, with $\beta,\gamma$-unsaturated alkenols in at least a triple molar excess in the presence of oxides or salts of the bivalent mercury and addition compounds of the boron trifluoride, preferably in a mixture with inert organic solvents as is well known in the art.

Furthermore, the invention is concerned with processes for the production of monohydroxy diethers of $\beta,\gamma$-unsaturated alkenols and alkanols with a characteristic that one etherifies a monoether of $\beta,\gamma$-unsaturated alkenols with trivalent alkanols of the general formula:

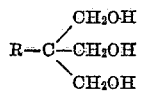

with $\beta,\gamma$-unsaturated alkenols in the presence of oxides or salts of bivalent mercury and addition compounds of boron trifluoride, preferably in mixture with inert, organic solvents as is well known in the art.

Beside that, the invention is also concerned with processes for the production of monohydroxy diethers with the characteristic that one etherifies a mixture consisting of:

(a) trivalent alkanols of the general formula:

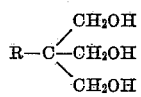

(b) monoethers of $\beta,\gamma$-unsaturated alkenols with trivalent alkanols of the general formula:

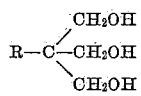

and (c) $\beta,\gamma$-unsaturated alkanols in the presence of oxides or salts of bivalent mercury and addition or complex compounds of boron trifluoride.

One can use for example as $\beta,\gamma$-unsaturated alkenols: allyl alcohol, methallyl alcohol, ethallyl alcohol, allyl chloride alcohol, crotyl alcohol, phenyl allyl alcohol, methyl vinyl carbinol, 1,4 butene diol.

As monoethers from $\beta,\gamma$-unsaturated alkenols with trivalent alkanols of the general formula:

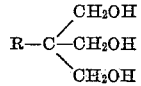

There will be produced for example:

Trimethylolethane monoallylether
Trimethylolethane monomethallylether
Trimethylolethane monoethallylether
Trimethylolethane monochlorallylether
Trimethylolethane monocrotylether
Trimethylolethane monophenylallylether
Trimethylolpropane monoallylether
Trimethylolpropane monomethallylether
Trimethylolpropane monoethallylether
Trimethylolpropane monochlorallylether
Trimethylolpropane monocrotylether
Trimethylolpropane monophenylallylether
Phenyltrimethylolmethane monoallylether
Phenyltrimethylolmethane monomethallylether
Phenyltrimethylolmethane monoethallylether
Phenyltrimethylolmethane monochlorallylether
Phenyltrimethylolmethane monocrotylether
Phenyltrimethylolmethane monophenylallylether Furthermore, the monoethers from trimethylolethane, or -propane, with methylvinylcarbinol, may be produced. In the general formula:

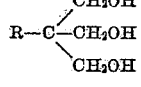

R signifies alkyl radicals such as methyl-, ethyl-, propyl-, butyl-, isobutyl-, amyl-, hexyl-, heptyl- or aryl radicals, such as phenyl- or aralkyl radicals, such as benzyl. Let us enumerate, by way of example as trivalent alkanols with three methylol groups on one carbon atom, the following compounds:

Trimethylolethane
Trimethylolpropane
Phenyltrimethylolmethane or
Trimethylolisobutane In the process, etherification takes place preferably in the presence of an inert organic solvent, for example benzene. This solvent serves on the one hand as a "dragging agent" (Schleppmittel), on the other hand, however, it makes possible the separation of the water formed through etherification, since most of the β,γ-unsaturated alkenols which may be involved can be mixed with water in any ratio. A washing process, as in the case of the known processes mentioned in the beginning, for the production of monooxydiethers will, however, not be necessary in this case. Rather, the excessive β,γ-unsaturated alkenol, as well as the solvent, can be separated through distillation from the reaction mixture and can be fed to the next charge, so that any kind of loss of solvents and other substances which may still be contained therein, will be avoided. Furthermore, the present process will bring about the great advantage that through the omission of a washing process the contamination of the waste water with poisonous, or foul smelling substances will be avoided.

The monohydroxy diethers, which can be produced in accordance with the present process, are solvents for a large number of organic compounds, and they are, furthermore, valuable primary materials for the production of air-drying synthetic resins, which are suitable for the manufacture of molded articles and especially of coatings.

In the reaction of monoethers from β,γ-unsaturated alkenols with trivalent alkanols of the general formula:

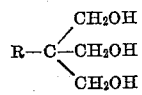

with β,γ-unsaturated alkenols, it will be expedient to insert at least 1.5 mol β,γ-unsaturated alkenol for 1 mol of monoether. One will achieve particularly smooth reactions, if one uses for 1 mol of monoether 2 to 3 mols or more of β,γ-unsaturated alkenol.

The following compounds proved themselves to be suitable as boron trifluoride-addition- or complex compounds:

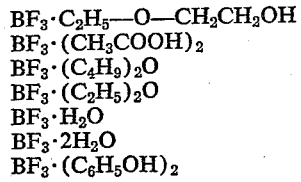

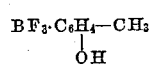

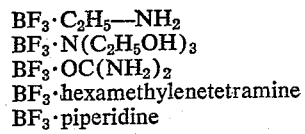

From among these compounds, the boron trifluoride compounds without nitrogen are particularly preferred.

One process for the etherification of monovalent, non-tertiary alcohols with allyl alcohol in the presence of a soluble mercury salt and of a strong acid, especially also in the presence of complexes of the boron trifluoride, has been known from the French Patent 1,181,168. From this patent, however, nothing can be deduced about the fact that such a process would also be usable for the etherification of trivalent alkanols which carry three methylol groups on one carbon atom. However, in the process according to the present invention, it must be considered as a surprising fact, that in case of the use of a molar excess of a β,γ-unsaturated alkenol, it is, of more than 3 mol up to preferably about 4 mol to 1 mol of the pertinent trivalent alkanol, which supports three methylol groups on one carbon atom, the etherification will stop in essence at the formation of the diether, so that the latter can be obtained with a good yield. But it is also possible to use a greater excess of β,γ-unsaturated alkanol. Likewise, in the case of the new process, it is surprising that considering the large number of possible etherification products, which the trivalent alcohol, or its mono- or diallyl ethers can form by themselves or with one another, in the overwhelming number of cases only the mono-hydroxy diallyether will develop.

EXAMPLE 1

*Production of trimethylolethane diallylether*

600 g. (5 mol) trimethylolethane
1015 g. (17.5 mol) allyl alcohol and
175 g. benzene were placed into a two-liter-capacity, three-necked flask equipped with a stirrer, a thermometer and with a column of approximately 35 cm. height and filled with Raschig-rings, and were heated in an oil bath. A separator equipped with a cooler was placed on the column, and said separator made it possible to separate the water which was forming and to let the solvent flow back in the cycle into the reaction vessel. When the temperature had risen to approximately 80° C. a homogeneous solution formed. And now, as a catalyst, 3.8 g. mercury (II)-oxide and 3.8 g. boron trifluoride acetic acid with a content of 36% boron trifluoride was added and the whole mixture was heated to boiling. After about 4½ hours, about 50 ml. of an aqueous distillate had separated. Once more the same quantity of catalyst was added and was further heated to boiling, until after a further 5 hours a total quantity of 125 ml. of distillate had developed, whereupon again catalyst was added and the operation, which has already been described, was repeated until after a total time of 18 hours 255 ml. of aqueous distillate were present. Use of catalyst amounted to 19 g. mercury (II)-oxide and 19 g. boron trifluoride acetic acid. Following this, the benzol and the excess allyl alcohol, serving as solvents, were distilled off under decreased pressure.

In order to remove the metallic mercury, developed through reduction of the mercury (II)-oxide, the residue was treated with about 20 g. of zinc dust and a few drops of concentrated hydrochloric acid, was stirred for about 30 minutes and was subsequently neutralized with a saturated soda solution. The water, which was added during that process, was distilled off under decreased pressure. After the filtering off process, there was a yield of 952 g. of crude etherification product. The latter was fractionated under decreased pressure, whereby the following fractions developed:

(1) Fraction: Kp (3 mm.) 96 to 108° C. 672 g. trimethylolethane diallylether
   Hydroxyl number: 220 (theoretically 280)
   Iodine number: 250 (theoretically 254)
(2) Fraction: Kp (3 mm.) 108 to 140° C. 186 g. trimethylolethane monoallylether
   Hydroxyl number: 525
   Iodine number: 168

The main constituent part of this fraction is the monoallyether of the trimethylethane (hydroxyl number 700, iodine number 150). This fraction may be added at the next charge to the primary mixture.

(3) Residue: 94 g.

EXAMPLE 2

Production of trimethylolpropane diallylether

With the same apparatus, as described in Example 1, a mixture of 670 g. (5 mol) trimethylolpropane
1015 g. (17.5 mol) allyl alcohol and
175 g. benzene was caused to react in a corresponding manner, using the same quantity of the catalyst described there. After a total time of about 29 hours, a quantity of approximately 270 ml. of an aqueous distillate were obtained. Further treatment was just as in Example 1; it resulted in a yield of 1030 g. of crude etherification product.

With the fractionated distillation under decreased pressure, the following fractions resulted:

(1) Fraction: Kp (4 mm.) 100 to 122° C. 783 g. trimethylolpropane diallyether
   Hydroxyl number: 227 (theoretically 262)
   Iodine number: 225 (theoretically 237)
(2) Fraction: Kp (4 mm.) 122 to 160° C. 123.5 g. trimethylolpropane monoallylether
   Hydroxyl number: 585
   Iodine number: 139

This fraction can be used along with other material in the next charge, corresponding to the manner in which this has been described in the preceding example.

(3) Residue: 123.5 g.

EXAMPLE 3

Production of trimethylolpropane diallylether

With the same apparatus as described in Example 1, a mixture of 174 g. (1 mol) trimethylolpropane monoallylether
146 g. (2.5 mol) allyl alcohol and
78 g. (1 mol) benzol was made to react after addition of 2 g. HgO and 2 g. $BF_3 \cdot 2CH_3COOH$. After a period of 4½ hours, 17 ml. of watery distillate had separated off. Once more catalyst was added (1 g. HgO and 1 g. $BF_3 \cdot 2CH_3COOH$) until after another half hour of reaction time, altogether 24 ml. of watery distillate had been separated. Then the whole quantity of benzene and the excess allyl alcohol was distilled off under a vacuum.

In order to remove the metallic mercury, the residue was treated with about 4 g. of zinc dust and with a few drops of concentrated hydrochloric acid, it was stirred for about 30 minutes and subsequently it was neutralized with a saturated soda solution. The water, which was added during this process, was distilled off under a decreased pressure. After filtering off, a yield of 171 g. of crude etherification product resulted. The latter was fractionated under a vacuum, whereby the following fractions were obtained:

(1) Fraction: $Kp_4$ 110°–126°
   146 g. trimethylolpropane diallylether
   Hydroxyl number: 320 (theoretically 262)
   Iodine number: 204 (theoretically 237)
(2) Fraction: $Kp_3$ 125°–134°
   8.5 g. trimethylolpropane monoallylether
   Hydroxyl number: 623 (theoretically 643)
   Iodine number: 141 (theoretically 146)
(3) Reside: 15 g.

I claim:

1. A process for the production of monohydroxy diethers of $\beta,\gamma$-alkenols and alkanols wherein (1) trivalent alkenols of the general formula:

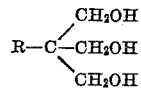

wherein R is selected from a group consisting of methyl and ethyl radicals, are etherified with (2) $\beta,\gamma$-alkenols containing not more than six carbon atoms and no other substituents with at least a triple molar excess in the presence of a mixed catalyst comprising (1) mercuric oxide and (2) boron trifluoride complexes selected from a group consisting of $BF_3 \cdot C_2H_5$—O—$CH_2CH_2OH$
$BF_3 \cdot (CH_3COOH)_2$
$BF_3 \cdot (C_4H_9)_2O$
$BF_3 \cdot (C_2H_5)_2O$
$BF_3 \cdot H_2O$
$BF_3 \cdot 2H_2O$
$BF_3 \cdot (C_6H_5OH)_2$

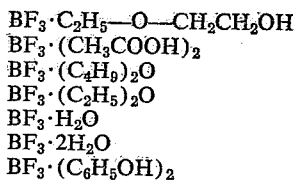

$BF_3 \cdot C_2H_5$—$NH_2$
$BF_3 \cdot N(C_2H_5OH)_3$
$BF_3 \cdot OC(NH_2)_2$
$BF_3 \cdot$ hexamethylenetetramine
$BF_3 \cdot$ piperidine the etherification being performed at substantially the boiling temperature of the reacting compounds and substantially within the range of 80–140° C., water being continuously removed from the reaction and the mixed catalyst being used substantially within the range of 1–5% by weight of the $\beta,\gamma$-alkenols, and being added in several stages during the reaction.

2. A process according to claim 1 wherein a mixture consisting of:

(a) a trivalent alkanol of the general formula:

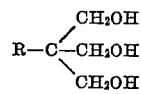

wherein R is selected from a group consisting of methyl and ethyl radicals, (b) a monoether of a $\beta,\gamma$-alkenol with a trivalent alkanol of the general formula:

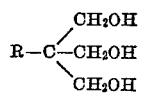

wherein R is selected from a group consisting of alkyl-, aryl- and aralkyl radicals, and (c) $\beta,\gamma$-alkenols containing not more than six carbon atoms and no other substituents, is etherified in the presence of a mixed catalyst comprising mercuric oxide and a boron trifluoride complex selected from a group consisting of $BF_3 \cdot C_2H_5$—O—$CH_2CH_2OH$
$BF_3 \cdot (CH_3COOH)_2$
$BF_3 \cdot (C_4H_9)_2O$
$BF_3 \cdot (C_2H_5)_2O$
$BF_3 \cdot H_2O$
$BF_3 \cdot 2H_2O$
$BF_3 \cdot (C_6H_5OH)_2$

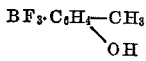

$BF_3 \cdot C_2H_5$—$NH_2$
$BF_3 \cdot N(C_2H_5OH)_3$
$BF_3 \cdot OC(NH_2)_2$
$BF_3 \cdot$ hexamethylenetetramine
$BF_3 \cdot$ piperidine 3. A process for the production of trimethylolethane diallylether according to claim 1 wherein trimethylolethane is etherified with allyl alcohol.

4. A process for the production of trimethylolpropane diallylether according to claim 1 wherein trimethylolpropane is etherified with allyl alcohol.

5. A process as set forth in claim 1 wherein the etherification reaction is carried out in the presence of an inert organic solvent.

6. The process according to claim 5 wherein the inert organic solvent is benzene.

7. A process for the production of monohydroxy diethers of $\beta,\gamma$-alkenols and alkenols wherein a monoether of $\beta,\gamma$-alkenols with trivalent alkanols of the general formula:

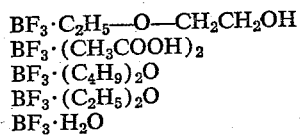

wherein R is selected from a group consisting of methyl and ethyl radicals, is etherified with an $\beta,\gamma$-alkenol containing not more than six carbon atoms and no other substituents in the presence of a mixed catalyst comprising (1) mecuric oxide and (2) boron trifluoride complexes selected from a group consisting of $BF_3 \cdot C_2H_5\text{—}O\text{—}CH_2CH_2OH$
$BF_3 \cdot (CH_3COOH)_2$
$BF_3 \cdot (C_4H_9)_2O$
$BF_3 \cdot (C_2H_5)_2O$
$BF_3 \cdot H_2O$
$BF_3 \cdot 2H_2O$
$BF_3 \cdot (C_6H_5OH)_2$

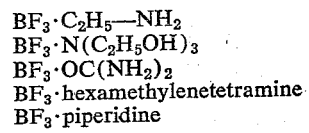

$BF_3 \cdot C_2H_5\text{—}NH_2$
$BF_3 \cdot N(C_2H_5OH)_3$
$BF_3 \cdot OC(NH_2)_2$
$BF_3 \cdot$ hexamethylenetetramine
$BF_3 \cdot$ piperidine the etherification being performed at substantially the boiling temperature of the reacting compounds and substantially within the range of 80–140° C., water being continuously removed from the reaction and the mixed catalyst being used substantially within the range of 1–5% by weight of the $\beta,\gamma$-alkenols, and being added in several stages during the reaction.

8. A process for the production of trimethylpropane diallylether according to claim 7 wherein trimethylolpropane monoallylether is etherified with allyl alcohol.

References Cited

UNITED STATES PATENTS 2,847,477   8/1958   Watanabe et al. _____ 260—615
2,924,621   2/1960   Krey et al. _____ 260—615 X LEON ZITVER, *Primary Examiner.*

H. T. MARS, *Assistant Examiner.*